Oct. 12, 1937.　　　　H. C. BECK　　　　2,095,906

CONTROL SYSTEM

Filed Oct. 4, 1932　　　　6 Sheets-Sheet 1

Inventor:-
Harold C. Beck,
by his Attorneys,
Howson & Howson

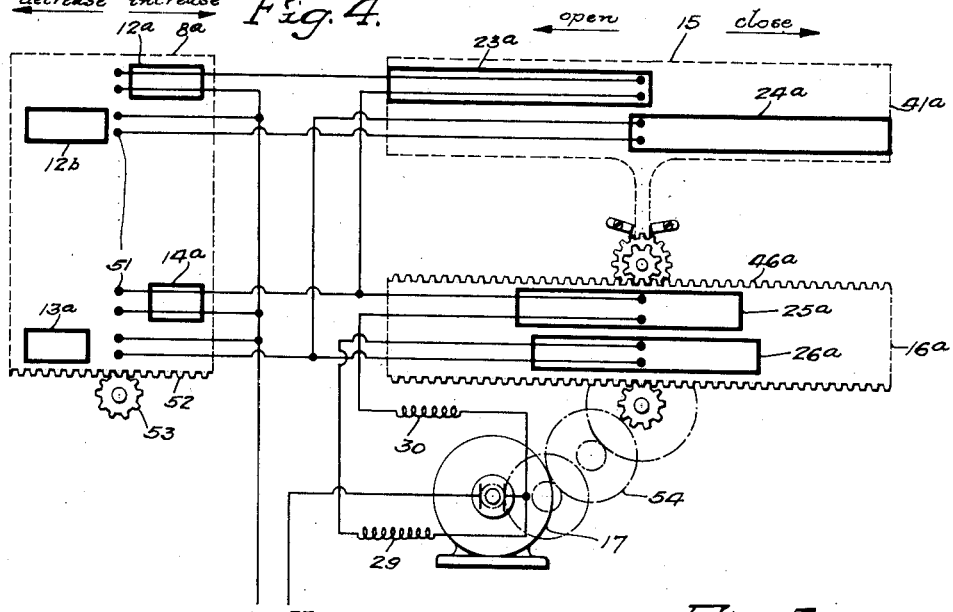
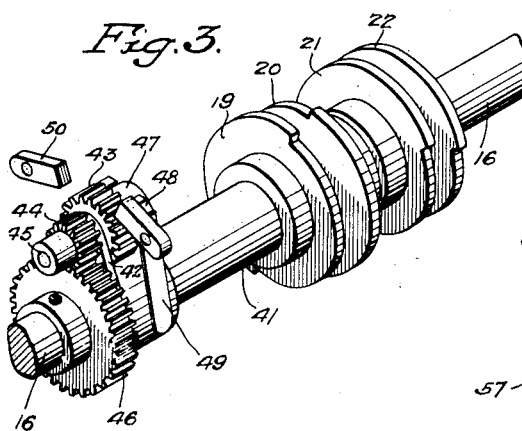
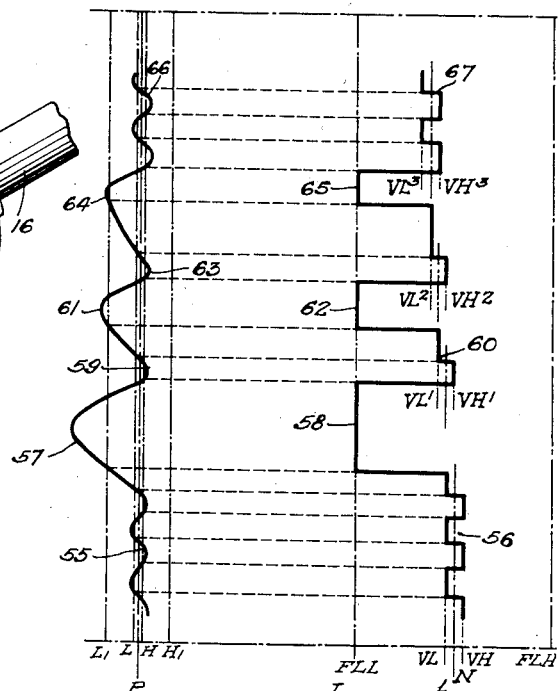

Inventor:-
Harold C. Beck
by his Attorneys,
Howson & Howson

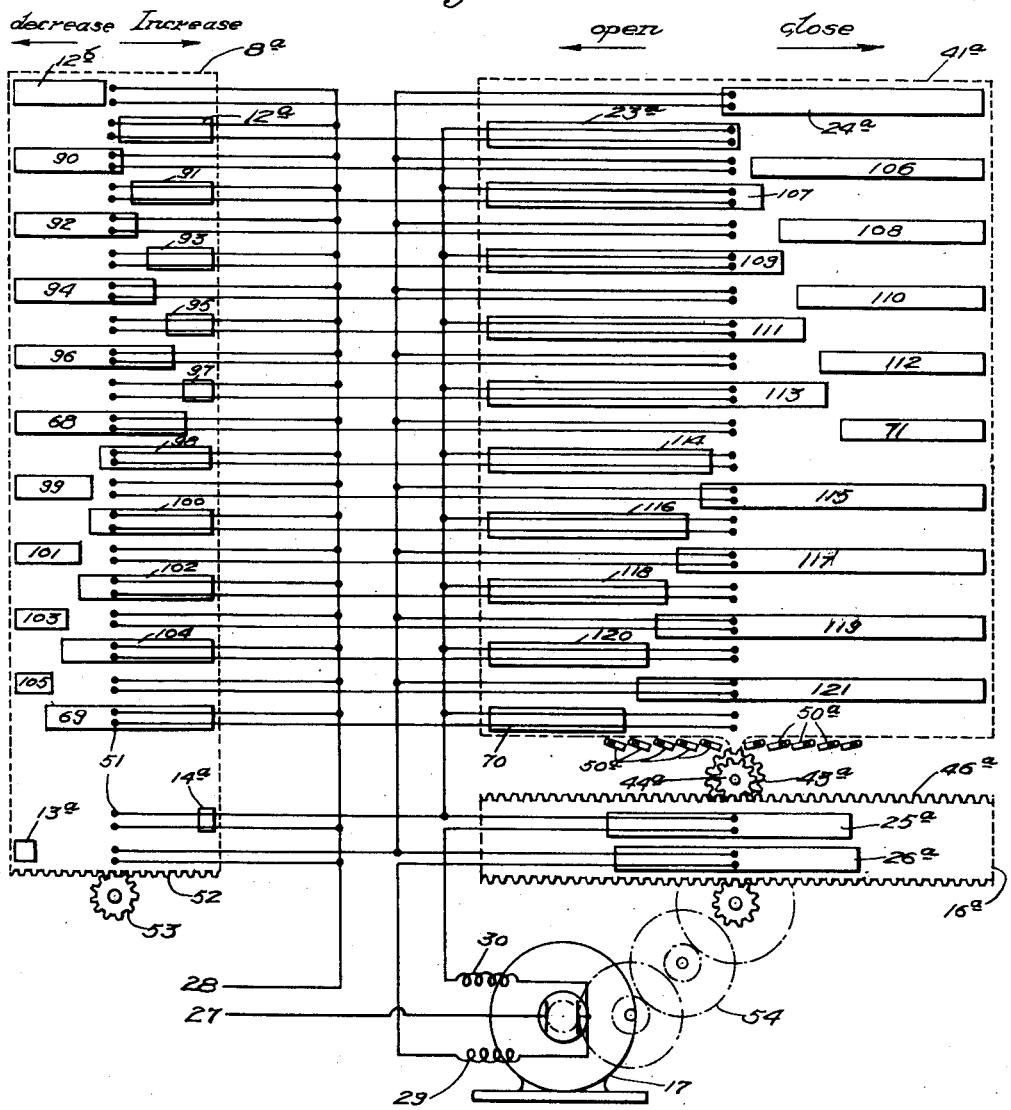

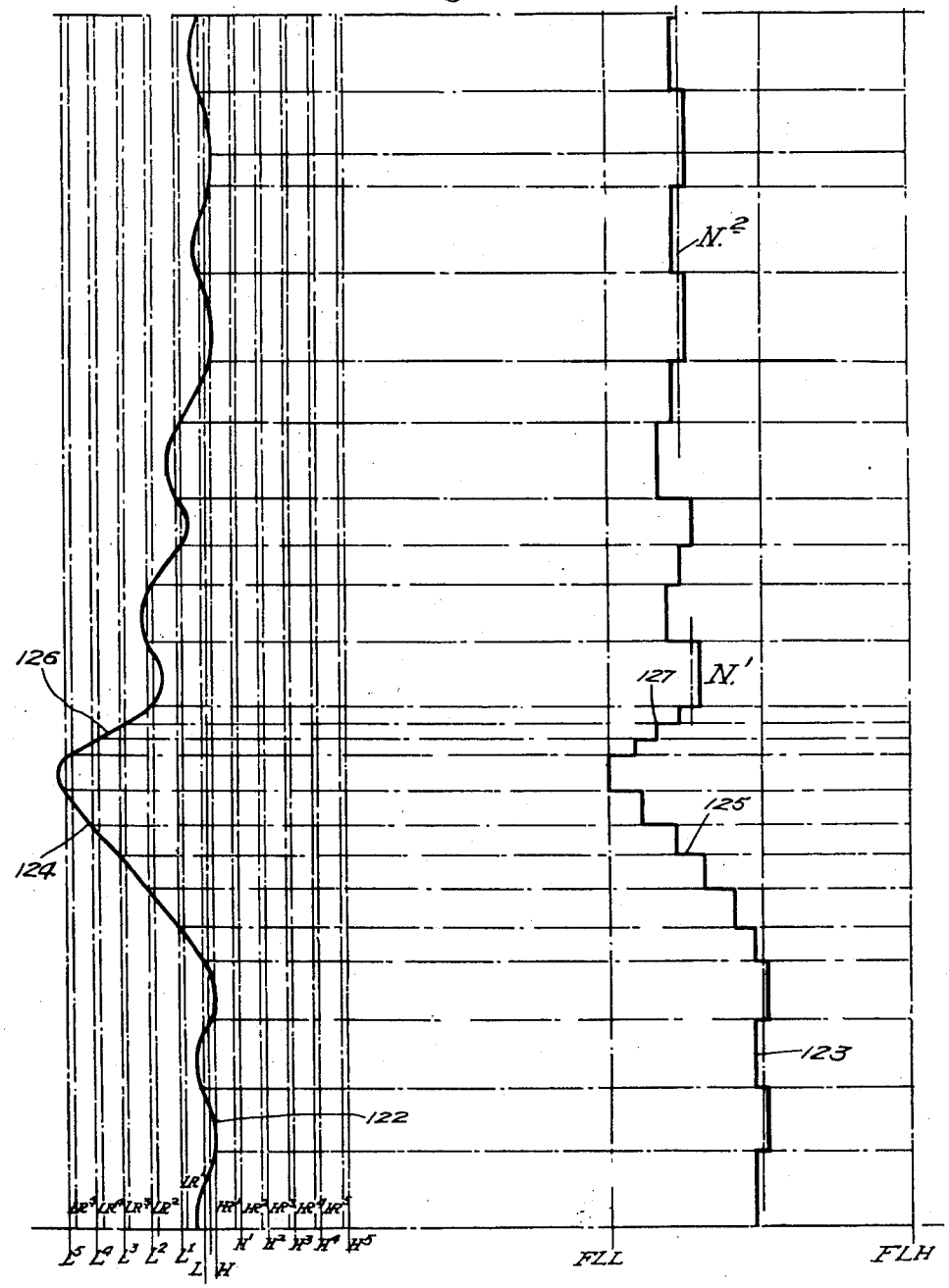

Patented Oct. 12, 1937

2,095,906

UNITED STATES PATENT OFFICE 2,095,906

CONTROL SYSTEM

Harold C. Beck, Philadelphia, Pa.

Application October 4, 1932, Serial No. 636,209

27 Claims. (Cl. 236—15)

This invention relates to control systems for producing or maintaining a predetermined condition such as temperature, pressure, flow, speed, etc. It may be utilized in the steering of ships, controlling the operation of the ship's rudder in response to variations in the course of the ship. It may be used in the regulation of cooling mediums to control the flow of brine or compressed gas, or any suitable medium for maintaining the desired temperature or pressure or both. The present invention is directed to the same general object or end as is that of my copending application, Serial No. 400,431, filed October 17, 1929. As to subject matter common to both applications, this application is to be considered a continuation of the prior one.

The general object of the invention is to provide a system characterized by certain novel features which render it more efficient in attaining the desired end than known systems of the same general class.

Another object of the invention is to provide a system in which an accurate balancing control action is had, which balances the corrective means to maintain the condition at the predetermined value against the tendency to change caused by variations in demand or the equivalent.

A further object of the invention is to provide a balancing control in which balancing is a function of the number of condition deviations, and is independent of the time of duration of the deviations.

It is another object of the invention to provide a balancing control action which is proportional to the magnitude of the condition variations.

Another object of the invention is to provide a control system which will avoid overbalancing in response to a prolonged deviation or change in the value of the condition.

A further object of the invention is to provide a control system which automatically adjusts its response to suit variable time lag in the factors being controlled.

Other objects will appear hereinafter as the description proceeds. I have chosen to disclose the invention herein with reference to the control of temperature, but it is to be understood that the invention is not thus limited but is applicable to the control of other quantities such as those above mentioned. In the drawings:

Fig. 3 is a partial perspective view illustrating a modified form of the control device for use in a modified and more complicated form of the invention;

Fig. 4 is a schematic illustration of the modified system;

Fig. 5 is a diagrammatic illustration similar to that of Fig. 2, illustrating the control action which takes place during the operation of the modified system;

Figs. 12 and 13 are illustrations similar to those of Figs. 4 and 5 respectively, illustrating a form of the invention in which control action is substantially proportional to the magnitude of condition variations.

Figure 1:
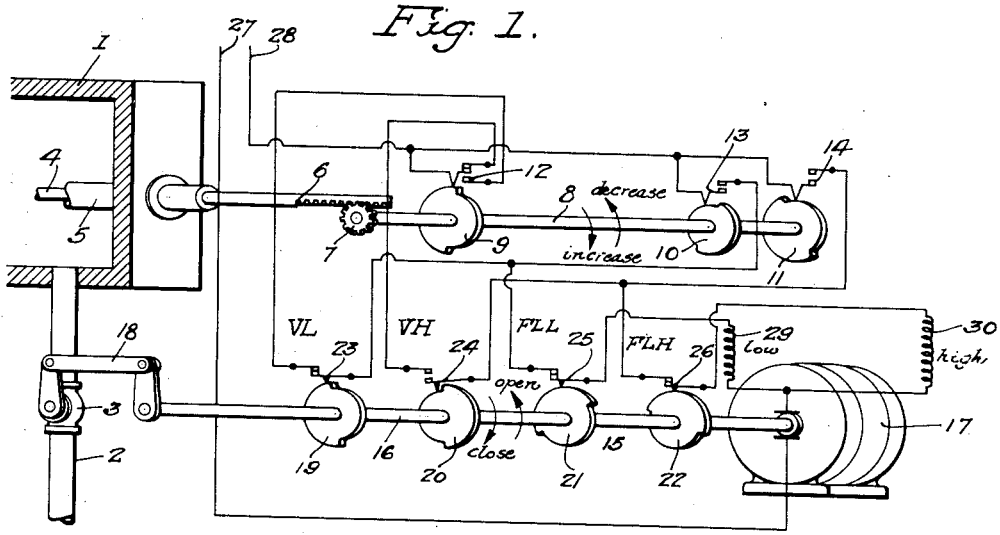
Fig. 1 is a schematic illustration of a simple form of the invention.

Before proceeding with a detailed description of the invention as illustrated herein, it is believed advisable that the meaning of certain terms or expressions used herein be given in order to enable a clear understanding of the invention. The following definitions are, therefore, outlined.

*Condition.*—This word is used to designate the quantity whose value is being controlled, or maintained such as temperature, speed, etc.

*Control point:* is the value of the condition that the control system is intended to maintain.

*Corrective force or maintaining force.*—These terms are used interchangeably to mean the factor whose value is being regulated to maintain the condition at the control point. In the case of furnace temperature control they mean fuel rate, and are governed by the position of the valve. In controlling the course of a ship, they mean the thrust of the rudder, and are governed by the rudder position.

*Corrective means.*—This term is used to designate the element or combination of elements which serve to directly maintain or control the condition. In the case of furnace temperature control, the term means the fuel control valve.

*Control action:* is the change made in the value of the maintaining force to oppose condition variations. In the description of temperature control here outlined it is the valve action. In another control description it might be rheostat action; in another, change in rate of coal feed; in others, it might deal with reflux flow, air flow, rudder position, etc.

*System in balance.*—This term is used to mean that the maintaining force is the proper value to maintain the condition at the control point without further control action. For example, in the case of controlling the course of a ship it means the rudder position is correct to maintain the ship on its course. (Theoretically this system is never in perfect balance because the valve never comes to rest mid-way between VH and VL, but the discussion in speaking of the system being "in balance" means that the theoretically right maintaining force lies between the values VH to VL, in effect at the time.)

*Balance of the valve:* is the term used to denote the positions governed by the intermediate limits VH and VL. of the valve operating mechanism, see Fig. 5. The system is not always in balance when the valve is in the VH or VL. position. This term is used interchangeably with "control setting" and "balance zone".

*Demand.*—Demand is the combination of factors which requires the control action to set up a certain corrective force to maintain the value of the condition at the control point. Variations in demand usually require certain control action to offset the tendency to a condition variation. For example, a draft of air projected against a furnace represents a demand change, and requires an adjustment in fuel rate to compensate for the added heat loss. A change in rate of passing work through the furnace has the same effect, and is one of the more common demand changes. Raising the control point also changes the demand, and requires more fuel in the case of a furnace. A change in B. t. u. value of the fuel, while not a change in demand, has the same effect, and this control system may be used effectively to correct for such a change as well as for a real demand change.

In steering ships, a change in wind velocity or direction constitutes a demand change, as does also a change in water current, or change in the ship's course, etc.

*Time lag.*—This is the elapsed time from the moment control action is made, to the moment some effect of such control action is perceptible.

Referring to Fig. 1 of the drawings, I denotes a furnace which is fed by fuel supplied through pipe 2 controlled by a valve 3. A thermostat of commercial type is mounted in the furnace wall and responds to temperature changes within the furnace. This thermostat may consist of an expansible metal rod 4 mechanically connected to a fixed metal tube 5 having a different coefficient of expansion than the rod. The rod 4 is provided with a rack 6 which meshes with gear 7 on rotatable shaft 8. It will be apparent that the thermostat in response to temperature variations within the furnace will cause rotation of shaft 8 in a direction depending upon whether the temperature variation is an increase or decrease. As long as the desired predetermined temperature exists within the furnace, shaft 8 will take up a definite position.

Mounted upon shaft 8 are switch-operating cams 9, 10 and 11, which have associated therewith switches 12, 13 and 14, respectively. Cam 9 and its associated switch 12 are designed to effect control in response to slight temperature deviations from the predetermined temperature, or in other words, to effect control during slight temperature fluctuations within a small range. To this end, switch 12 comprises a pair of opposed stationary contacts with a movable contact therebetween operated by the lobe of cam 9. The position of shaft 8 illustrated corresponds to a temperature value within the furnace at the lower limit of the small range above-mentioned, the switch 12 being closed at its upper contact. As the temperature varies between the relatively close limits defining the range mentioned, the movable contact of switch 12 oscillates back and forth between the stationary contacts to close selective circuits.

Switches 13 and 14 and their associated cams 10 and 11 are designed to set a fixed limit in either direction upon the control action. In other words, these switches are not effective until the temperature within the furnace varies over a wide range in either direction to rotate shaft 8 through a considerable arc.

In order to control the valve 3, there is provided a control device designated generally by reference character 15, which comprises a shaft 16 driven by reversible motor 17 and operatively connected to the valve by linkage 18. The control device is adapted to be controlled in accordance with temperature variations within the furnace by rotatable shaft 8 and its associated switches. To this end, there are provided on shaft 16 cams 19, 20, 21 and 22 having associated therewith respectively switches 23, 24, 25 and 26. Supply lines 27, 28, which may be connected to any suitable source of electrical energy, have the various switches and motor 17 connected thereto in the manner clearly illustrated. It will be noted that field windings 29 and 30 of motor 17 are included in parallel branch circuits which also include the switches in the manner illustrated. The branch circuit, through winding 29, includes switch 25 and parallel branches through switches 23 and 12 and switch 13, respectively. The parallel branch circuit, through winding 30, includes switch 26 and parallel branches through switches 24 and 12 and switch 14 respectively.

Switches 23 and 24 and their associated cams are adapted for cooperation with switch 12 to control shaft 16, and, therefore, valve 3, in accordance with slight temperature variations within the above-mentioned small range. These switches, viz., 23 and 24, may be termed "intermediate limit" devices, and in order to clarify the description by correlating these switches with the control action illustrated in Fig. 2 and described hereinafter, they are also designated VL and VH, meaning "valve low" and "valve high", respectively. Switches 25 and 26 and their associated cams are adapted for cooperation with switches 13 and 14, respectively, to control shaft 16, and, therefore, valve 3, within the wide range of temperature variations defined by switches 13 and 14 and their cams. Switches 25 and 26 may be termed "final limit" devices and are designated F. L. L. and F. L. H., meaning "final limit low" and "final limit high" respectively.

Let it be assumed that the temperature within the furnace is at the predetermined desired value. In normal operation, slight fluctuations in temperature will take place and if they are sufficient to actuate switch 12, the valve 3 will be operated accordingly by the control device 15. Assume, for example, that the parts of the system are in the condition illustrated in Fig. 1. If now a decrease in temperature takes place, rod 4 will contract, moving rack 6 toward the left and effecting counter-clockwise rotation of shaft 8. If the temperature variation is sufficient, the lobe of cam 9 will move the movable contact of switch 12, causing it to engage the lower stationary contact. This will complete a circuit from line 28 through the lower contact of switch 12, the closed contacts of switch 23, the closed contacts of switch 25, winding 29 of motor 17, and the armature of the motor to line 27. This will effect actuation of motor 17 in a counter-clockwise direction to rotate shaft 16, so as to open valve 3. The motor will be actuated until the above-mentioned circuit is opened at switch 23. Since the rotation of shaft 16 to effect opening of the valve is counter-clockwise, as illustrated by the indicating arrow, a slight movement only of the motor and shaft 16 is necessary to open switch 23. The valve is, therefore, opened only slightly to increase the fuel supply to compensate for the slight deviation in temperature and bring it back to the predetermined value. It will be noted that in moving sufficiently to open switch 23, shaft 16 causes actuation of switch 24 by its cam 20 to close the switch. The branch circuit of switch 24 will not be closed, however, since switch 12 is opened at its upper contact. In the event that an increase in temperature takes place, however, shaft 8 will rotate in a clockwise direction, thereby causing actuation of switch 12 to close at its upper contact and open at its lower contact. This will close a circuit from line 28 through the upper closed contact of switch 12, the closed contacts of switch 24, the closed contacts of switch 26, motor winding 30, and the motor armature to line 27. This will cause actuation of motor 17 and shaft 16 in a clockwise direction to close valve 3, this closing action being limited by the opening of switch 24, restoring the parts to the relative positions illustrated in Fig. 1. It will thus be apparent that switches 23 and 24 act as intermediate limits as above stated to cause actuation of valve 3 to correct slight temperature variations.

Let us assume now that a relatively great decrease in temperature within furnace 1 takes place. The intermediate control apparatus, which functions as above described, will not open the valve sufficiently to compensate for this very large variation. The counter-clockwise rotation of shaft 8 caused by such a decrease will cause switch 13 to close under the influence of its cam 18. This will close a circuit from line 28 through switch 13, switch 25, winding 29, and the motor armature to line 27. Motor 17 will now rotate shaft 16 in a counter-clockwise direction to open valve 3. This actuation of device 15 will continue until switch 25 opens to interrupt the above traced circuit through the motor. It will be noted that during this time, switch 24 closes and remains closed.

The temperature inside the furnace will now rise, due to the increase in fuel supply and shaft 8 will be rotated in a clockwise direction. Rotation of this shaft will not cause actuation of the control device 15 until switch 12 is actuated, opening at its lower contact and closing at its upper contact. At this time, the position of shaft 8 will correspond approximately to the desired temperature. Bearing in mind that switch 24 is closed, it will be apparent that a circuit will now be completed from line 28 through the upper contact of switch 12, switch 24, switch 26, motor winding 30, and the armature of motor 17 to line 27. Motor 17 will now rotate shaft 16 in a clockwise direction until the circuit is opened at switch 24. Control device 15 will now have been returned to the position governed by its intermediate limit VH. In the event that a large increase in temperature takes place, the apparatus will function in a manner similar to that just described, except that the shafts will rotate in reverse directions and the other switches will govern the control action.

Figure 2:
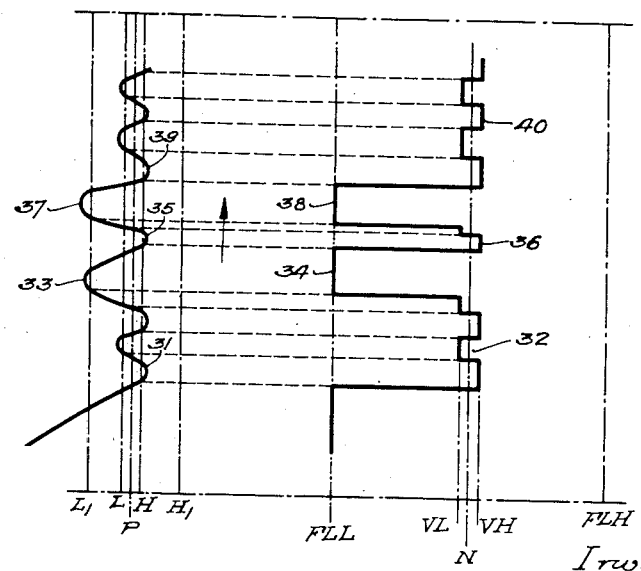
Fig. 2 is a diagrammatic illustration of the control action which takes place during operation of the system of Fig. 1.

The operation of the device of Fig. 1 will be clearer from the explanatory charts of Fig. 2. In that figure, the temperature fluctuations over an arbitary period of time are illustrated at the left side of the figure, while the control action is depicted at the right side. The vertical broken line designated P represents the desired predetermined temperature condition or control point, while the corresponding line N represents the value of the maintaining force about which the intermediate valve limits are set to operate. Lines L and H represent the limits defined by switches 12 of Fig. 1, while lines $L_1$ and $H_1$ represent the limits defined by switches 13 and 14 of Fig. 1. Lines VL and VH represent the intermediate limits of the control action, as defined by the intermediate limit switches 23 and 24 of Fig. 1, respectively, while lines F. L. L. and F. L. H. represent the final control limits defined by the final limit switches 25 and 26 respectively of Fig. 1.

The letters L. H., V. L. and V. H. and the corresponding letters with subnumerals are chosen to designate "low", "high", "valve low" and "valve high". In other words, a deviation in temperature on the L side of line P represents a decrease, while a deviation on the H side represents an increase in temperature. Similarly, a deviation in the control action on the V. L. side of line N represents low side operation which in this case is opening of valve 3, while a deviation on the V. H. side of line N represents high side operation which in this case is closure of the valve.

Considering time to be in the direction of the vertical arrow, it is seen that the temperature returns from a wide deviation to the desired value and fluctuates about the desired predetermined condition as at 31. At the same time, the control action returns from limit F. L. L. and fluctuates in accordance with the slight temperature variations, as indicated at 32, because the demand is between the V. H. and V. L. valve position. After fluctuating back and forth between the limits L and H, the temperature suddenly deviates widely as at 33, because of an increase of demand which requires a fuel rate greater than that governed by the V. L. limit. Temperature crosses the limit $L_1$. The device simultaneously functions in accordance with the control action as illustrated at 34. The temperature deviation being a decrease, a wide opening of the valve results. By virtue of the control action, the temperature is brought back to the desired setting as at 35, and the control action follows, as at 36. However, the V. H. and V. L. valve positions govern fuel rates which are not sufficient to sustain the desired temperature condition in the presence of the new demand and the temperature again decreases as at 37. The control action follows as at 38, causing the temperature to return to the desired value, as at 39. The control action follows as at 40, and the predetermined condition is maintained because the demand has changed back again to require fuel rates governed by valve positions between V. H. and V. L.

It will be seen that in this simple system the control action is in small amount in response to small temperature deviations, and in large amount in response to large deviations. It will also be noted that when temperature returns to the control point, the valve returns to its former position. If the deviation had been caused by a sustained change in demand, the control is not perfect unless a balancing action is effected which permits the valve to assume a new position when temperature is at the control point, and Figs. 3, 4 and 5 show the method of accomplishing this balancing action. The specific description which follows will show how a change is made in the balance of the valve with each deviation.

In Figs. 3 to 5, there is illustrated a modified form of the device, in which a balancing action is had whenever the temperature deviates beyond the small range defined by contact segments 12a and 12b. This balancing action is effected by adjustment of the intermediate limits of the control device 15 of Fig. 4 with respect to its final limits. In order to more clearly understand this modified form of the device, it might be well to designate the control action had in the device of Fig. 1 as "primary" control action. Then, the control action had by virtue of adjustment of the intermediate limits may be termed "secondary" control action. Bearing in mind the construction of control device 15, as described above in connection with the device of Fig. 1, this device is modified as illustrated in the perspective view of Fig. 3. The final limit switch cams 21 and 22 are fixedly mounted upon shaft 16 as before, but the intermediate limit switch cams 19 and 20 are carried upon a sleeve 41, which is rotatably mounted on shaft 16. The sleeve fits snugly around the shaft so as to frictionally engage the same and to normally move therewith. A crank arm 42 is mounted upon the sleeve and rotatably carries ratchet wheel 43 and pinion 44, the ratchet wheel and pinion being mounted upon shaft 45. Pinion 44 meshes with gear 46 fixedly mounted upon shaft 16. A brake drum 47 is mounted upon shaft 45 and is engaged by brake shoes 48 carried at the ends of resilient fingers 49, the fingers in turn being mounted upon sleeve 41. Rotation of shaft 45 and the ratchet wheel and pinion carried thereby is opposed by the brake. A pair of oppositely disposed pivotally mounted pawls 50 are arranged so as to be engaged by ratchet wheel 43 upon predetermined movement thereof about shaft 16 in either direction. The pawls may be mounted in any suitable manner. This construction will be more clearly understood from the description of Figs. 8 to 11. For the purpose of the immediate description, it suffices to point out that rotation of shaft 16 in either direction carrying sleeve 40 with it will effect rotation of the ratchet wheel provided the rotation of the shaft is sufficient to cause engagement of the ratchet wheel with either pawl. If it is, the particular pawl engaged will tend to stop the ratchet wheel and, by virtue of the pinion 44 riding in gear 46, the sleeve 41 will be rotated with respect to shaft 16 an amount determined by the engagement of the pawl with the ratchet wheel. The pawls may be so arranged that only a slight notching action to move sleeve 41 is had, the ratchet wheel slipping by the pawl and being unaffected by it in its return motion. The pawls are spaced apart a distance corresponding to the intermediate limits V. H. and V. L. of the device so that slight fluctuations in temperature between these limits will merely cause the ratchet wheel to oscillate in the space between the pawls and will not cause any notching effect or movement of sleeve 41 relative to shaft 16.

This modified form of the device may be more clearly understood from the diagrammatic illustration of Fig. 4, wherein the elements of the system are represented in flat form for the sake of clarity. It will be apparent that shafts 8 and 16 and their associated cams and switches might well take the form of rotatable drums having circumferential contacts thereon adapted to engage fixed or stationary contacts. Thus, in Fig. 4, the flat layout 8a may represent a drum having thereon contact surfaces 12a, 12b, 13a, and 14a, respectively, corresponding to switches 12, 13 and 14 of Fig. 1. These contact surfaces are arranged to contact sets of stationary contacts designated generally at 51. Drum 8a is rotatable by virtue of gear 52 and pinion 53 meshing therewith. Pinion 53 may be rotated by the thermostat within the furnace in response to temperature variations, as will be clearly apparent.

The control device 15 is also illustrated in a flat layout and it will be noted that this device comprises relatively movable members 16a and 41a which correspond to shaft 16 and sleeve 41 of Fig. 3. The member 16a is driven by motor 17 through suitable gears designated generally by reference character 54 to effect the desired reduction in speed. The gear surface 46a corresponds to gear 46 of Fig. 3, while the pinion 44a corresponds to pinion 44, the ratchet wheel 43a and pawls 50a corresponding to the similar elements of Fig. 3. Member 41a is associated with member 16a so as to normally move therewith in the same manner that sleeve 41 normally moves with shaft 16. Slight oscillation of these members will not effect the above-described notching, but in the event of larger variations sufficient to cause engagement of either pawl 50a with ratchet wheel 43a, the member 41a will be moved relatively to member 16a, as above described. It will be understood that device 15 is preferably constructed as illustrated in Fig. 3 and that the illustration of Fig. 4 is merely to enable a better understanding of the system, the manner of illustration adapted being more readily understandable.

Considering now the operation of this modified form of device, so long as the temperature within the furnace remains at the desired predetermined value, member 8a will be positioned as illustrated so that the sets of contacts 51 will be centrally disposed between the contact segments 12a and 12b. At this time, no control action is necessary and none is had. Should the temperature vary from the desired value, however, in either direction sufficient to close a circuit at either segment 12a or segment 12b, a corresponding rotation of motor 17 and movement of members 16a and 41a will be effected, this movement being limited by contact segments 23a and 24a. For example, if the temperature should decrease, causing movement of member 8a in the direction of the "decrease" arrow, thereby causing a circuit closure at contact segment 12a, a circuit will be closed from supply line 28 through segment 12a, segment 23a, segment 25a, field winding 30 of motor 17 and the motor armature to supply line 27. Members 16a and 41a will move in the direction of the "open"

arrow to effect opening of the fuel supply valve. This movement and opening action will be slight, however, since contact 23 will open the circuit. A corresponding slight increase in the temperature will effect movement of members 41a and 16a in a manner which will be readily apparent from the foregoing description.

Should a large variation in temperature take place, however, a greater movement of members 16a and 41a with a corresponding actuation of the fuel supply valve will be had. For example, should the temperature decrease greatly, thereby causing a large movement of members 8a, a circuit will be closed at contact segment 14a which may be readily traced through winding 30 of the motor 17. This will cause movement of members 16a and 41a to open the fuel supply valve. As the ratchet wheel engages the left hand pawl, a notching effect, as described above, is had and member 41a will be moved slightly with respect to member 16a. The effect of this action is to move the intermediate limits of device 15 with respect to the fixed limits. The continued movement of members 16a and 41a will be interrupted by opening of the circuit by contact segment 25a. The fuel supply valve is now opened to its maximum extent and the temperature will, accordingly, rise, moving member 8a in the direction of the increase arrow. When this member has moved sufficiently to cause engagement of segment 12b with its contacts, a circuit will be completed through this segment, segment 24a, segment 26a, and field winding 29 of motor 17 to return member 16a and 40a to an intermediate setting, the return movement being interrupted by opening of the circuit at contact 24a. Thus, the control device 15 is returned to a new intermediate setting by virtue of the adjustment of the intermediate limits with respect to the final limits, which action, as above stated, may be called "secondary" control action. A large increase in temperature will cause operation of members 16a and 41, as well as secondary control action in the reverse direction.

Fig. 5 illustrates diagrammatically the operation of the modified form of device shown in Figs. 3 and 4. Considering this diagram, it will be noted that initially the temperature fluctuates about the desired value as at 55, and the control action follows the slight temperature variations as at 56. A large decrease in temperature takes place at 57 which is the result of an increase in demand and the control action follows at 58 to the final low limit F. L. L. The fuel-supply valve is now at its maximum opening and the increased fuel rate brings the temperature back to the desired value, as at 59. The control action follows as at 60, but by virtue of the secondary control action above described, the intermediate limits have been shifted relative to the final limits and the balance of the valves is, therefore, moved to a new position closer to the low limit F. L. L. than formerly. Slight variations in temperature about this point will cause the control action to take place between new intermediate limit positions V. L'. and V. H'. In the instance being considered, the control action was not sufficient to properly balance the fuel supply with the new demand and the temperature, therefore, again decreases at 61. The control action follows at 62, causing the temperature to return as at 63. Again by virtue of the secondary control action, the control setting is shifted still farther toward the F. L. L. limit and the new intermediate limit positions are V. L.² and V. H.². The temperature again deviates at 64 and the control action follows at 65, bringing the temperature back and shifting the balance of the valves even farther toward the F. L. L. limit. The proper balance of the system has now been obtained because temperature fluctuates about the desired value, as at 66, the control action following about the new balance of the valve as at 67.

While the operation of this form of the device has been illustrated with reference to a decrease in temperature, the device will function in the same manner for an increase in temperature, excepting, of course, that the primary and secondary control actions will be had in the reverse direction. By means of this device, the fuel supply is automatically balanced with the demand. In other words, in a device such as that illustrated in Figure 1, there is only one setting of the intermediate limits V. H. and V. L. of the valve, and close control is had only when the demand falls between these limits. When the demand is outside of these limits, larger temperature variations take place in order to produce the proper average fuel supply, and the resultant average temperature is below the control point if the demand is greater than the V. H. to V. L. settings, and above the control point if the demand is less than the V. H. to V. L. settings. This change in average temperature with changes in demand is undesirable, and is known as a drooping characteristic. The device of Fig. 4, however, functions to automatically adjust the intermediate limits to handle fuel rates on either side of the demand, regardless of how the demand may change. Thus, close control of temperatures is secured with any demand, and the drooping characteristic is eliminated. Furthermore, the manner in which this balancing action is accomplished requires each new balance of the valve to prove itself before further balancing is effected, and thus overbalancing is avoided. The total change in balance is proportional to the number of deviations and independent of their duration.

The control action consists of a primary valve movement which is recovered when the value of the condition returns to the control point, and a secondary action which is permanent with respect to any given deviation. The primary action is capable of operating the valve to its maximum amount in either direction without causing secondary action to its maximum amount in that direction. This feature is important because in many control systems a deviation may be caused by a temporary disturbance which should be opposed by a large corrective action. When the value of the condition returns to the control point, however, demand may be the same, or nearly the same as before the deviation and the corrective action should be largely recovered, which is the result secured with the system when adjustment is made for a small balancing action. If on the other hand, the deviation had been accompanied by a sustained change in demand, the first return of the condition to the control point would be followed by further deviations, each deviation would be accompanied by some balancing action. Ultimately, the balanced position of the valve would prove correct to maintain the condition at the control point and subsequent valve action would be only between H. and L. until another change in demand developed.

Refinement of this system consists in increasing the number of switches and pawls, within suitable limits, thus making primary action roughly proportional to the magnitude of the deviation, and secondary action an adjustable proportion of the primary action.

Only brief mention has thus far been made of time lag other than that this system is designed for control of processes in which some time lag exists.

Because of time lag, when a condition variation becomes visible, there has been a deficiency in the maintaining force which must be made up, and it is the function of the primary control to make up this deficiency. The magnitude of the primary control action is governed by the magnitude of the temperature deviation. The rate with which the primary control action is made could be instantaneous, were it not for practical considerations such as shock to the system being controlled. It is, therefore, made at a rate as fast as is commensurate with good engineering of the mechanical equipment.

The existence of time lag in the factors being controlled makes it desirable to produce control action in greater amount than the apparent immediate requirement. In the form of the invention thus far outlined, this is taken care of in response to condition deviations away from the control point, but it will be noted that when the condition returns to the control point, no control action is effected until the condition actually arrives at the control point. Also, secondary control action is had only in response to deviations away from and completely back to the control point. A further improvement in the invention is illustrated in Figures 6 and 7, which show a means of effecting control action in response to a condition change towards the control point.

Figure 6:
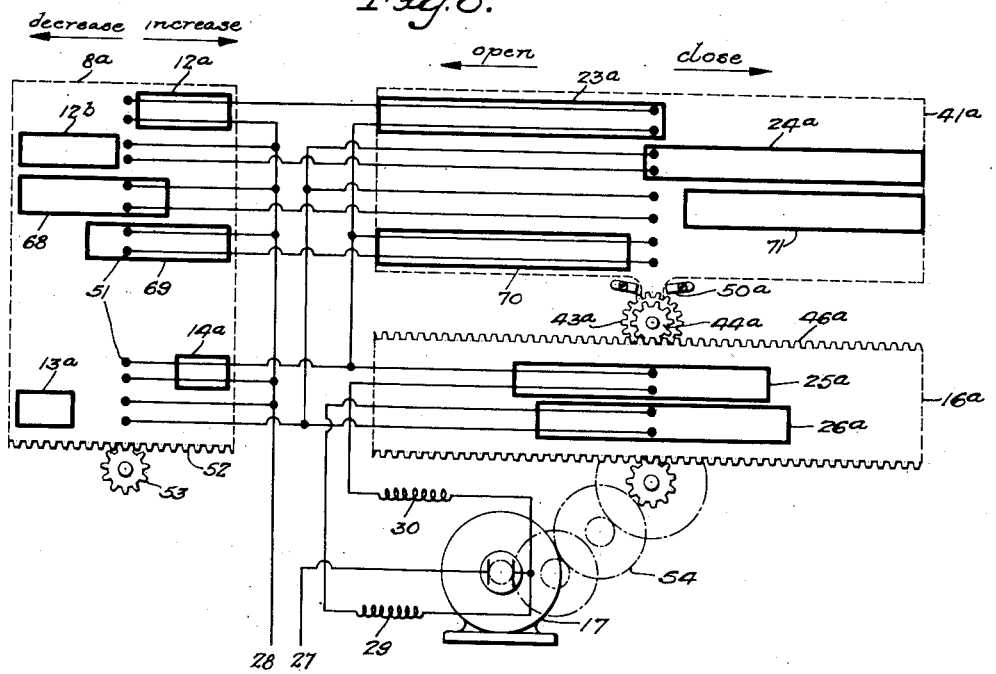
Figs. 6 and 7 are illustrations similar to those of Figs. 4 and 5, respectively, illustrating a still further modified and more complicated form of the invention.
Figure 7:
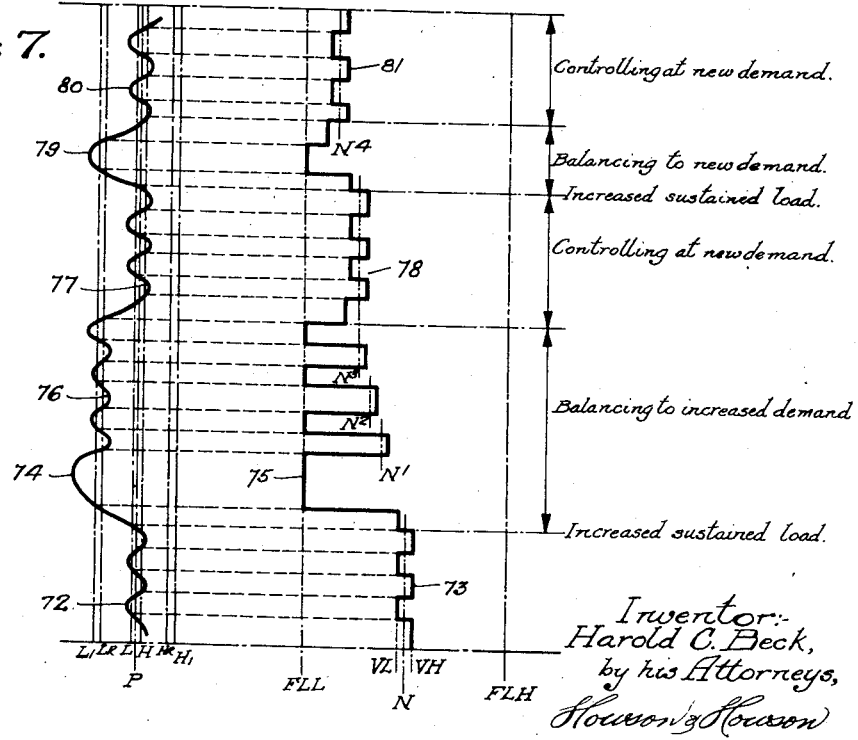
Figure 8:
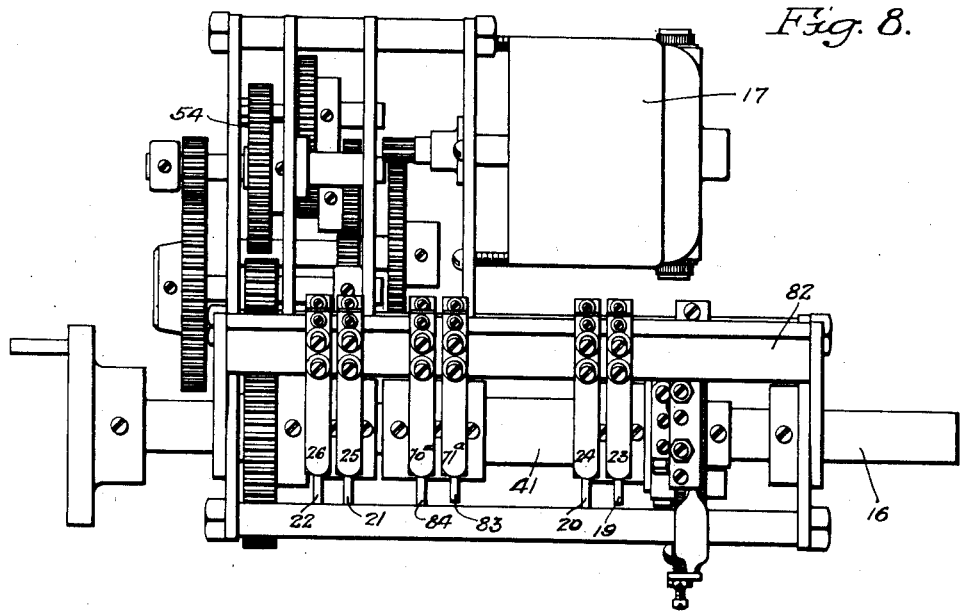
Fig. 8 is a plan view of a practical form of the control device of the last-mentioned modification.
Figure 9:
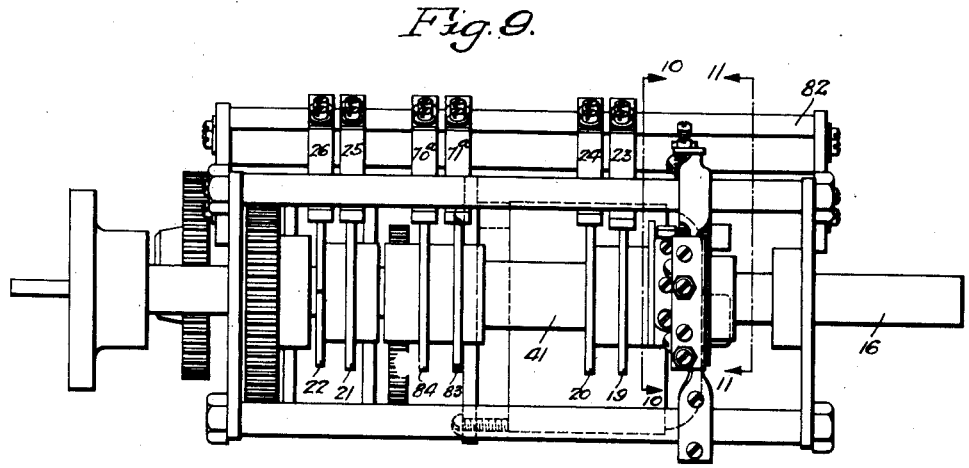
Fig. 9 is an elevational view of this control device.
Figure 10:
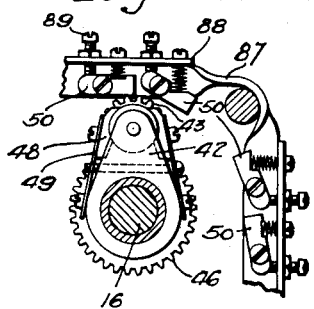
Fig. 10 is a detail sectional view along line 10—10 of Fig. 9.
Figure 11:
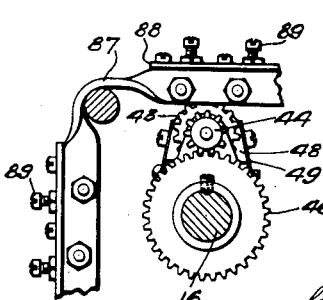
Fig. 11 is a detail sectional view along line 11—11 of Fig. 9.

Fig. 6 is an illustration similar to that of Fig. 4 of a still further modified form of the device, the preferred structure of the control mechanism of this device being shown in Figs. 8 to 11 described hereinafter. The elements of this form of the device corresponding to those of the device of Fig. 4 have been designated by the same numerals. In this case, however, member 8a is provided with additional contact segments 68 and 69, which cooperate with stationary contacts. Member 41a is also provided with contact segments 70 and 71, which are adapted to cooperate with segments 68 and 69. The purpose of these additional switch elements is to obtain what may be termed a reverse valve action, which assists the balancing action to more effectively control the temperature during wide temperature variations.

Considering the operation of this form of the device, slight temperature variations will cause it to function in a manner identical with the device of Fig. 4 as described above. In other words, the additional switches are ineffective for slight temperature variations and only enter into the operation when wide variations take place. Assuming that a large decrease in temperature takes place, causing member 8 to move in the direction of the "decrease" arrow and closing a circuit at contact segment 14a through segment 25a and motor winding 30. As was the case with the device of Fig. 4, this will cause motor 17 to actuate members 41a and 16a in a direction to open the fuel-supply valve, the motion of these members being limited by the breaking of the circuit at segment 25a. During this operation, the notching action of the ratchet wheel and pawls will take place to move member 41a relative to member 16a, thereby shifting the intermediate limits, as described above. It will be noted now that with members 41a and 16a in their new positions, contact segment 71 will have engaged its contacts but no circuit completion will take place because contact segment 68 has been moved sufficiently to leave its contacts.

With the fuel-supply valve in its newly opened position, the temperature will, of course, start to rise and member 8a will be moved in the direction of the "increase" arrow. Sufficient movement of the member in this direction will cause segment 68 to engage its contacts to complete a circuit through this segment, contact segment 71, as above noted, contact segment 26a, motor winding 29, and the armature of motor 17. This will cause movement of members 41a and 16a in a direction to close the fuel-supply valve. Movement of these members will be limited by segment 71 leaving its contacts to open the circuit. At this time, the control device 15 will not have returned to the control setting but will have moved in that direction to partially close the valve. If the temperature continues to rise, member 8a, continuing to move in the direction of the "increase" arrow, the control device will be brought back to the control setting by the completion of a circuit through contact segment 12b, segment 24a, segment 26a, motor winding 29, and the motor armature. Segment 24a will, of course, limit the movement. If it should happen, however, that after partial closing of the valve, the temperature should start to decrease, then actuation of the control device 15, as governed by the limit imposed by contact segment 14a, will be had. The parts are so arranged that the partial return movement of members 41a and 16a to partially close the supply valve returns the ratchet wheel past the pawl which had previously operated it. The second decrease in temperature will, therefore, cause secondary control action to again take place. This cycle will be repeated as often as the temperature repeatedly decreases after partial closing of the valve, as described above. All the while, new control settings will be given device 15 and when the intermediate settings prove sufficient to maintain temperature at the control point, the fuel supply will be balanced to the new demand.

This operation will be more readily understood from Fig. 7 which is a diagram similar to those of Figs. 2 and 5. In this diagram, however, the vertical lines LR and HR designate the temperature values at which the additional contacts are effective. It will be noted that initially the temperature fluctuates as at 72 between the limits defined by contact segments 12a and 12b, the action following as at 73. Due to an increased demand, temperature varies widely at 74 and control action follows at 75 to open the supply valve to its maximum position, F. L. L. The temperature starts back toward the desired value, but the repeated partial closing of the supply valve by the control device, as described above, causes a temperature fluctuation as at 76. At this time, changes N′, N² and N³ in the balance of the valve are obtained, due to the repeated secondary control action. Finally, the balance of the valve has been shifted sufficiently to return temperature to the control point, as at 77, where it fluctuates about the control point, the control action following as at 78 and operating to maintain the average fuel rate at the correct value. A wide decrease in temperature again takes place at 79, but, at this time, a single shifting of the control setting to point N⁴ is sufficient, the temperature returning to the desired value, as at 80, and the control action following, as at 81.

Although the operation of this form of the device has been described and illustrated in Fig. 7 with reference to decrease in temperature, the operation is the same for temperature increase, the only difference being that the shifting of the control setting is in the other direction toward the other final limit and the other limit switches function to effect the control. A study of the temperature chart of Fig. 1 shows changes in temperature trend taking place below the control point. Reversals in temperature trend are accompanied by both primary and secondary control action, see Fig. 7. It will be noted that primary action is in a direction to oppose trend changes, while the secondary control action is in a direction to urge the condition towards the control point.

Thus, the primary action, in opposing the tendency for the condition to return to the control point is effective to lessen or prevent overshooting of the condition, to a value beyond the control point. At the same time, secondary action being in a direction to urge the condition towards the control point, ultimately the intermediate valve positions will handle fuel rates correct to maintain the condition at the control point.

A greater number of switches might be used to modify the magnitude of the control action steps shown in the drawings without departing from the invention.

Figs. 8 to 11 illustrate the preferred construction of the control device of Fig. 6, this construction being generally similar to that illustrated in Figs. 1 and 3. In this device, the parts corresponding to those of the previously described devices have been similarly designated. Motor 17 functions to drive shaft 16 through the reduction gears 54. The intermediate limit switches are shown at 23 and 24, while the final limit switches are shown at 25 and 26. These switches are suitably carried by the frame of the device which is designated generally by reference character 82. As in the device of Fig. 3, the movable sleeve 41 carries the operating cams 19 and 20 for switches 23 and 24, and in addition carries operating cams 83 and 84 for switches 70a and 71a, these switches also being supported by the frame of the device. Switches 70a and 71a and their associated operating cams correspond to the contact segments 70 and 71 of Fig. 6. The operating cams of these switches are formed so as to effect the same operation as described above in connection with Fig. 6.

Shaft 16 carries the ratchet wheel 43 and pinion 44 with their associated elements, as above described in connection with Fig. 3. Pawls 50 are pivotally mounted for cooperation with the ratchet wheel upon bar 87, which also carries springs 88 and adjustable stops 89, these latter elements being associated with the pawls to urge them into the path of the ratchet wheel and to enable adjustment of the pawls.

It will be noted that although a single pair of pawls is used in the devices of Figs. 4 and 6, the preferred construction under consideration utilizes two sets of pawls so that they are arranged in pairs in opposed relation. By means of this construction, the secondary control action above discussed is obtained twice during a variation in temperature from the desired value to the final limit in either direction. It will be obvious that any number of pawls may be used to give the desired secondary control action during a single variation in temperature to the final limit. Preferably, the two sets of pawls herein illustrated are arranged so that when the control device returns to partially actuate the valve under the influence of switches 70a and 71a as above described, the ratchet wheel will have passed the outermost pawl and if additional secondary control action is had at this time, it will be limited to the action of the single outer pawl on the ratchet wheel.

The operation of the device of Figs. 8 to 11 will be clearly understood from the foregoing description of the operation of Fig. 6, these devices being identical and Fig. 6 being intended primarily to illustrate clearly the intended operation.

Fig. 12 is an illustration of a further modified form of the device, in which control action is substantially proportional to the magnitude of temperature variations. This illustration is similar to that of Fig. 6 and the elements of this form of the device corresponding to those of the device of Fig. 6 have been designated by the same numerals. In this case, member 8a is provided with additional contact segments 90 to 105 which cooperate with the stationary contacts 51. Member 41a is also provided with additional contact segments 106 to 121 which are adapted to cooperate with segments 90 to 105. The number of pawls 50a has also been increased to give secondary control action which is substantially proportional to the magnitude of temperature variations and proportional also to the primary control action which is effected by such variations.

Considering the operation of this form of the device, as the temperature increases, the following contact segments of member 8a make contact with their associated stationary contacts in the order named: 12b, 99, 101, 103, 105 and 13a. This energizes the field 29 of motor 17 successively through the following contact segments of member 41a in the order named: 24a, 115, 117, 119, 121 and 26a. Following each closure of the respective motor circuits by the above-named contact segments of member 8a, the motor operates in a direction to move members 16a and 41a in the direction of the "close" arrow. The above-named contact segments of member 41a successively open the respective motor circuits. Accompanying this movement of members 16a and 41a, the gear 43a is notched by the pawls 50a, thereby offsetting the relation of member 41a to member 16a with each step and producing a secondary control action which is proportional to the total travel of member 16a, which, in turn, is substantially proportional to the amount that the temperature increases.

As the temperature subsequently decreases from the increased value toward the control point, member 8a moves in the direction of the "decrease" arrow, causing the following contact segments to successively close their respective motor circuits, these contacts having been opened during increase in temperature:— 69, 104, 102, 100 and 98. The circuit closures by these contacts energize the field 30 of motor 17 to move members 16a and 41a in the direction of the "open" arrow, the circuit closures being effected successively through the following contact segments of member 41a in the order named:— 70, 120, 118, 116 and 114. During the reverse actuation by motor 17, gear 43a passes the pawls 50a without notching due to the reverse direction of travel of the gear with respect to the pawls. Member 41a is now back to approximately a center position but member 16a assumes a new position offset from its former position by the amount of the notching or secondary control action. By former position is meant that which it had before the increase in temperature above mentioned.

A decrease in temperature is accomplished by similar action of the control mechanism but in the opposite directions. In such case, contact segments 12a, 91, 93, 95, 97 and 14a of member 8a cooperate with contact segments 23a, 107, 109, 111, 113 and 25a of members 41a and 16a. A subsequent increase in temperature causes cooperation of contact segments 68, 96, 94, 92, and 90 of member 8a with contact segments 71, 112, 110, 108 and 106 of member 41a.

The diagram of Fig. 13 illustrates certain temperature variations and their accompanying control action, this diagram being similar to that of Fig. 7. The vertical lines of Fig. 13 correspond to those of the previous figure above noted, there being, however, a greater number of such lines in Fig. 13 to represent the temperature values at which the additional contacts are effective. The vertical lines are designated respectively by appropriate reference characters. It will be noted that initially the temperature fluctuates as at 122 between the limits defined by contact segments 12a and 12b, the control action following at 123. Due to increased demand, the temperature varies widely at 124 and control action follows in successive steps at 125 to open the supply valve substantially proportionately to the temperature variation, all the while secondary control action being effected by notching of the pawls in the manner above described. The temperature starts back toward the desired value, as at 126, the control action following in steps at 127. Due to the secondary control action, however, which action is also proportional to the temperature variation and to the primary control action as above noted, the balancing point is shifted to N'. The temperature gradually finds its way back to the control point with the result that a new balancing point $N^2$ is established for control at the new demand.

Other ways of accomplishing the results herein outlined while still practicing the invention might be suggested as follows:

Relative motion of the intermediate and final limits might be caused by the action of a motor introduced so as to replace or to work in conjunction with the pawls 50. The motor might be operated in impulses to produce motion corresponding to the action of the pawls.

The feature of this control system which permits the valve to remain at either final limit, or at some intermediate position other than its balanced position for any indefinite or prolonged time, without causing balancing or secondary action substantially its maximum amount as a result, could be duplicated by introducing a balancing cut-out contact to open the circuit to the motor which might replace the pawls. In the case of an air operated control system, this balancing cut-out might consist of a stop valve operable under certain circumstances of large or prolonged condition variations, to prevent balancing action.

Important characteristics of this control system may be duplicated in an electrical bridge circuit consisting of a slide wire on the thermostat or condition measuring device connected in one arm of the bridge circuit, another slide wire on the control action mechanism connected in an opposite arm of the bridge circuit, a contacting galvanometer or the like, arranged to energize the valve mechanism motor to restore any unbalance in the bridge circuit caused by condition variations by effecting a corresponding movement of the slide wire on the valve mechanism. The balancing or secondary control action may then be duplicated by introducing a bias in the bridge to balance demand changes with an action similar to that accomplished by the pawls in this device.

While the systems disclosed herein have been designed to provide a central zone or limited range of operation for small temperature fluctuations, it is conceivable that this operation may be reduced to zero proportion merely by a sufficiently close setting of the intermediate limit switches V. L. and V. H.

Although several embodiments of the invention have been illustrated and described herein, various changes and modifications may be made and any such changes as fall within the scope of the appended claims are deemed to be a part of the invention.

In the claims, the terms "primary control means" and "secondary control means" designate respectively the means for effecting the separable and distinct control actions which are had with the systems of Figs. 3 to 13. The term "primary control means" refers to the simple control mechanism shown alone in Fig. 1 and embodied in the systems of Figs. 3 to 13. The term "secondary control means" refers to the mechanism which balances the valve at an optimum control setting for a new demand, which mechanism is embodied in Figs. 3 to 13.

I claim:

1. In a system for automatically producing or maintaining a predetermined condition, as temperature, pressure, flow, speed, etc., corrective means, means for rendering said corrective means effective in response to departure from said predetermined condition, at least a portion of the control action due to said last named means being permanent with respect to said departure and independent of its duration.

2. In a system for automatically producing or maintaining a predetermined condition, as temperature, pressure, flow, speed, etc., corrective means, means for rendering said corrective means effective in response to condition variations, and means for rendering said corrective means effective a given amount for a given variation from said predetermined condition, the control action due to said last named means being permanent with respect to said given variation and independent of its duration.

3. In a system for automatically producing or maintaining a predetermined condition, as temperature, pressure, flow, speed, etc., corrective means, means for rendering said corrective means effective substantially proportionately to departure from said predetermined condition, and means for rendering said corrective means effective a given amount for a given departure, the control action due to said last named means being permanent with respect to said given departure and independent of its duration.

4. In a system for automatically producing or maintaining a predetermined condition, as temperature, pressure, flow, speed, etc., corrective means, means for rendering said corrective means effective in response to departure from said predetermined condition and in a direction to oppose said departure, and means for subsequently rendering said corrective means effective a lesser amount and in a reverse direction for each departure, at least a portion of the control action due to said last two means being permanent with respect to the departure which caused it and independent of the duration of said departure.

5. In a system for automatically producing or maintaining a predetermined condition, as temperature, pressure, flow, speed, etc., corrective means, means for rendering said corrective means effective in response to departure from said predetermined condition and in a direction to oppose said departure, and means responsive to partial return to said predetermined condition for rendering said corrective means effective in substantially predetermined proportion to the action of said last-recited means and in a reverse direction.

6. In a system for automatically maintaining a condition, as temperature, pressure, flow, speed, etc., at a desired control point, corrective means having a control setting, primary control means responsive to a condition variation for rendering said corrective means effective in a direction to oppose said variation, and secondary control means for varying the control setting of said corrective means in substantially predetermined proportion to the magnitude of said departure so as to urge said condition toward said control point whenever it varies therefrom.

7. In a system for automatically producing or maintaining a predetermined condition, as temperature, pressure, flow, speed, etc., corrective means having a balance zone, primary control means responsive to departure of predetermined magnitude from said predetermined condition for rendering said corrective means effective in substantially its maximum amount in a direction to oppose said departure, and secondary control means responsive to said departure for shifting the balance zone of said corrective means, the action of said secondary control means in response to said departure being less than its maximum amount, said secondary control means being operative to shift the balance zone of said corrective means throughout substantially the entire range of operation of said correcting means.

8. In a system for automatically producing or maintaining a predetermined condition, as temperature, pressure, flow, speed, etc., corrective means, and control means responsive to departure from said predetermined condition for rendering said corrective means effective, said control means having fixed final limits of action and adjustable intermediate control settings, the control action due to adjustment of said control settings being permanent only with respect to any given alteration of said control means to a limit.

9. In a system for automatically producing or maintaining a predetermined condition, as temperature, pressure, flow, speed, etc., corrective means, and control means responsive to departure from said predetermined condition for rendering said corrective means effective, said control means having fixed final limits of action and automatically adjustable intermediate control settings, the magnitude of the control action due to adjustment of said control settings being permanent with respect to any given departure and independent of its duration.

10. In a system for automatically producing or maintaining a predetermined condition, as temperature, pressure, flow, speed, etc., a control device, means operable by said device for correcting condition variations, and means responsive to condition variations for actuating said control device, said device comprising a movable member, final control means fixedly associated with said member, intermediate control means adjustably associated with said member, and means comprising a ratchet and pawl for adjusting said intermediate control means in response to condition variations of predetermined amplitude.

11. In a system for automatically producing or maintaining a predetermined condition, as temperature, pressure, flow, speed, etc., a movable member, means for moving said member substantially proportionately to the magnitude of condition variations, a second movable member, means operable by said second member for correcting the varied condition, means for actuating said second member, means associated with each of said members for cooperatively controlling said actuating means to move said second member substantially in accordance with movement of said first member, whereby said correcting means is operated substantially proportionately to the magnitude of condition variations, and means for adjusting the control means associated with said second member in a manner dependent on the direction of condition variation and proportionately to the number of condition variations to influence said correcting means.

12. In a system for automatically producing or maintaining a predetermined condition, as temperature, pressure, flow, speed, etc., a movable member, means for moving said member substantially in accordance with condition variations, a second movable member, means operable by said second member for correcting the varied condition, means for actuating said second member, means associated with each of said members for cooperatively controlling said actuating means to move said second member substantially in accordance with movement of said first member, whereby said correcting means is operated substantially in accordance with condition variations, and means responsive to predetermined movement of said second member due to like movement of said first member for adjusting the control means associated with said second member in a manner to operate said correcting means in anticipation of the necessary adjustment thereof, said adjustment being permanent with respect to a given condition variation and independent of its duration.

13. In a system for automatically producing or maintaining a predetermined condition, as temperature, pressure, flow, speed, etc., a movable member, means for moving said member substantially in accordance with condition variations, a second movable member, means operable by said second member for correcting the varied condition, means for actuating said second member, means associated with each of said members for cooperatively controlling said actuating means to move said second member substantially in accordance with movement of said first member, whereby said correcting means is operated substantially in accordance with condition variations, and means responsive to predetermined movement of said second member due to like movement of said first member for adjusting the control means associated with said second member in a manner to operate said correcting means in anticipation of the necessary adjustment thereof, said adjustment being permanent with respect to a given condition variation and independent of its duration in response to a given departure.

14. In a system for automatically producing or maintaining a predetermined condition, as temperature, pressure, flow, speed, etc., a movable member, means for moving said member substantially in accordance with condition variations, a second movable member, means operable by said second member for correcting the varied condition, means for actuating said second member, means associated with each of said members for cooperatively controlling said actuating means to move said second member substantially in accordance with movement of said first member, whereby said correcting means is operated substantially in accordance with condition variations, and means responsive to predetermined movement of said second member due to like movement of said first member for adjusting the control means associated with said second member in a manner to operate said correcting means in anticipation of the necessary adjustment thereof, said adjustment being permanent with respect to a given condition variation and independent of its duration, said secondary means being unable to operate in its maximum amount in response to a given deviation.

15. In a system for automatically producing or maintaining a predetermined condition, as temperature, pressure, flow, speed, etc., a control device, means operable by said device for correcting condition variations, and means responsive to condition variations for actuating said control device, said device comprising a movable member, final control means fixedly associated with said member, intermediate control means adjustably associated with said member, ratchet and pawl elements, one of said elements being attached to said adjustable control means, the other of said elements being arranged for operative engagement by said one element upon movement of said member in response to certain condition variations, and gear elements connecting said one element and said member, whereby adjustment of said adjustable control means relative to said member is effected.

16. In a system for automatically producing or maintaining a predetermined condition, as temperature, pressure, flow, speed, etc., a control device, means operable by said device for correcting condition variations, and means responsive to condition variations for actuating said control device, said device comprising a movable shaft, final and intermediate limit switches associated with said shaft, operating cams for said final limit switches mounted on said shaft, a movable sleeve carried by said shaft, operating cams for said intermediate limit switches mounted on said sleeve, an arm carried by said sleeve, a ratchet wheel and pinion carried by said arm, a gear on said shaft meshing with said pinion, and stationary pawls arranged for operative engagement by said ratchet wheel upon predetermined movement of said shaft in response to condition variations of predetermined amplitude, whereby adjustment of said sleeve and the cams mounted thereon relative to said shaft is effected.

17. In a system for automatically producing or maintaining a predetermined condition, as temperature, pressure, flow, speed, etc., corrective means, primary control means for rendering said corrective means effective in response to condition variations in an amount proportionate to the magnitude of such variations, and secondary control means for rendering a substantially predetermined proportionate part of the primary control action permanent with respect to a condition variation.

18. In a system for automatically producing or maintaining a predetermined condition, as temperature, pressure, flow, speed, etc., corrective means, means for actuating said corrective means in response to departure from said predetermined condition, and means for rendering at least a portion of the control action permanent with respect to said departure and in predetermined proportion to the magnitude of said departure.

19. In a system for automatically producing or maintaining a predetermined condition, as temperature, pressure, flow, speed, etc., corrective means having a control setting, control means responsive to departure from said predetermined condition for rendering said corrective means effective, said control means comprising a device having coaxially arranged relatively movable members and electrical means controlled by said members for governing the control setting and action of said corrective means, and means for varying the relative positions of said members in response to condition variations.

20. In a system for automatically producing or maintaining a predetermined condition, as temperature, pressure, flow, speed, etc., corrective means having a control setting, control means responsive to departure from said predetermined condition for rendering said corrective means effective, said control means comprising a device having relatively movable circular members and electrical means controlled by said members for governing the control setting and action of said corrective means, and means for varying the relative positions of said members in response to condition variations.

21. In a system for automatically producing or maintaining a predetermined condition, as temperature, pressure, flow, speed, etc., corrective means having a control setting, control means responsive to departure from said predetermined condition for rendering said corrective means effective, said control means comprising a device having coaxially arranged relatively movable members and electrical means controlled by said members for governing the control setting and action of said corrective means, and means for moving said members together and relative to one another in response to condition variations.

22. In a system for automatically producing or maintaining a predetermined condition, as temperature, pressure, flow, speed, etc., means for controlling or maintaining said condition, primary control means for rendering said controlling means effective in response to condition variations, secondary control means tending to balance the controlling means against the condition, and means for causing partial secondary control action in response to large condition variations of indefinitely prolonged duration.

23. The method of controlling the temperature in a furnace by measuring the extent of the deviation of the furnace temperature from a predetermined value and employing said deviations to change the fuel supply to the furnace first momentarily to a relatively large amount and thereafter return the fuel supply practically to its original value, thereby neutralizing any non-permanent disturbance in the furnace and thereafter if the disturbance is of permanent character change the fuel supply gradually to a different value as may be required to balance the fuel supply to the fuel demand while maintaining the temperature substantially at the predetermined control point except momentarily while a change in fuel demand of the furnace occurs.

24. The combination of a fuel fired furnace, a fuel supply pipe to said furnace, a valve in said fuel supply pipe, a device in the furnace for measuring the extent of temperature variation from a predetermined value, mechanical and electrical means between said temperature measuring instrument and said fuel valve to close the valve to its minimum open position so soon as the temperature rises above the predetermined value, and further means between said temperature measuring instrument and said fuel valve for returning the fuel valve to an open position greater than the minimum opening but different from the original position when the temperature again returns to its predetermined value.

25. The combination of a fuel fired furnace, a fuel supply pipe to said furnace, a valve in said fuel supply pipe, a device in the furnace for measuring the extent of temperature variation from a predetermined value, mechanical and electrical means between said temperature measuring instrument and said fuel valve to cause said fuel valve to open to its maximum open position so soon as the temperature drops below the desired predetermined value, and further means between said temperature measuring instrument and said fuel valve for returning the fuel valve to an opening position less than the maximum open position but different from the original position, when the temperature again reaches its predetermined value.

26. In a system for automatically producing or maintaining a predetermined condition, as temperature, pressure, flow, speed, etc., corrective means, means for rendering said corrective means effective in response to departure from said predetermined condition, and additional means for rendering at least a portion of the control action permanent with respect to said departure, said portion being substantially proportionate to the magnitude of the departure and independent of its duration.

27. In a system for automatically producing or maintaining a predetermined condition, as temperature, pressure, flow, speed, etc., corrective means, control means for rendering said corrective means effective in response to condition variations, and additional control means for actuating said corrective means in an amount proportionate to the number of condition variations in a given time irrespective of the duration of such variations.

HAROLD C. BECK.